United States Patent
Yeh et al.

(10) Patent No.: US 10,496,128 B2
(45) Date of Patent: Dec. 3, 2019

(54) METHOD FOR OBTAINING TIMESTAMP AND COMPUTER DEVICE USING THE SAME

(71) Applicant: Wistron Corporation, New Taipei (TW)

(72) Inventors: Chung-Chieh Yeh, New Taipei (TW); Ming-Sheng Wu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 149 days.

(21) Appl. No.: 15/710,792

(22) Filed: Sep. 20, 2017

(65) Prior Publication Data
US 2018/0341285 A1 Nov. 29, 2018

(30) Foreign Application Priority Data
May 25, 2017 (TW) .............................. 106117334 A

(51) Int. Cl.
*G06F 1/14* (2006.01)
*G06F 9/48* (2006.01)
*G06F 13/24* (2006.01)
*G06F 1/12* (2006.01)

(52) U.S. Cl.
CPC .................. *G06F 1/14* (2013.01); *G06F 1/12* (2013.01); *G06F 9/4887* (2013.01); *G06F 13/24* (2013.01)

(58) Field of Classification Search
CPC . G06F 1/14; G06F 1/12; G06F 9/4887; G06F 13/24
USPC ............ 714/3, 47.1; 370/469, 252; 710/269; 713/1; 702/89
See application file for complete search history.

(56) References Cited

U.S. PATENT DOCUMENTS

| | | | |
|---|---|---|---|
| 2005/0036512 A1* | 2/2005 | Loukianov ............ | H04J 3/0632 370/469 |
| 2006/0122799 A1* | 6/2006 | Chen ........................ | G04G 3/00 702/89 |
| 2011/0107072 A1* | 5/2011 | Lu ........................ | G06F 11/0745 713/1 |
| 2012/0266030 A1* | 10/2012 | Li ........................ | G06F 11/2215 714/47.1 |
| 2013/0262913 A1* | 10/2013 | Arai ..................... | G06F 11/1402 714/3 |
| 2014/0089546 A1* | 3/2014 | Machnicki .............. | G06F 13/24 710/269 |
| 2016/0134500 A1* | 5/2016 | Chen ................... | H04L 43/0817 370/252 |
| 2017/0041688 A1* | 2/2017 | Pitigoi-Aron ............ | H04Q 9/00 |

\* cited by examiner

*Primary Examiner* — Aurel Prifti
(74) *Attorney, Agent, or Firm* — Winston Hsu

(57) ABSTRACT

A computer device including a processor, a counter circuit and a baseboard management controller (BMC) is provided. The processor generates at least one signal. The counter circuit includes at least one counter, coupled to the at least one signal and receiving an internal clock signal of the computer device. The BMC is coupled to the at least one counter and activates the same. The at least one counter detects the at least one signal, so as to start counting for a count value according to the internal clock signal when the at least one signal is enabled. The BMC controls the at least one counter to stop counting and obtains an enabled timepoint of the at least one signal according to the count value and a timepoint where the at least one counter is stopped. The enabled timepoint serves as a timestamp of the at least one signal.

10 Claims, 3 Drawing Sheets

METHOD FOR OBTAINING TIMESTAMP AND COMPUTER DEVICE USING THE SAME

CROSS-REFERENCE TO RELATED APPLICATION

This application claims the priority benefit of Taiwan application serial no. 106117334, filed on May 25, 2017. The entirety of the above-mentioned patent application is hereby incorporated by reference herein and made a part of this specification.

BACKGROUND OF THE INVENTION

1. Field of the Invention

The invention relates to a method for improving computer functionality, and more particularly, to method for obtaining timestamp and a computer device using the method.

2. Description of Related Art

With the rapid spread of computer technology, people have an increasing demand for server systems. In response to market demands, Intelligent Platform Management Interface (IPMI) has been proposed by various manufacturers in the industry. IPMI is the next generation universal interface standard for a smart hardware management across different operating systems, firmware and hardware platforms. IPMI is capable of smartly monitoring, controlling and automatically reporting a massive amount of server operating statuses, so as to lower costs for the server system.

In general, a management server is one that uses a management platform of IPMI, and Baseboard Management Controller (BMC) is a core controller of said management platform. A system management software realizes managements for each managed device through communication with the BMC. BMC can record events occurred across the entire system of the management platform together with the corresponding timepoints into System Event Log (SEL) for administrators to look up.

While managing the servers, one of common problems for administrators is that a timestamp recorded in SEL by BMC is not very accurate. In terms of current technology, BMC can now perform a time correction during boot up by Basic Input/Output System (BIOS), or BMC itself can even perform the time correction with support functions from Network Time Protocol (NTP). Nonetheless, aforementioned methods for the time correction can only ensure the correctness of Real-Time Clock (RTC) for BMC but cannot guarantee the correctness of the timestamp recorded in SEL. This is because BMC adds the timestamp by polling each sensor when SEL is to be written. As restricted by a computing capability of BMC, BMC is unable to provide a very accurate timestamp for SEL, e.g., the timestamp cannot be accurate at millisecond level.

Based on the above reasons, when multiple events take places at closing timepoints (e.g., at millisecond level), administrators cannot determine an order in which these events occurred according to the timestamps recorded in SEL. Consequently, administrators will not be able to correctly find out the reason why these events occur. Accordingly, allowing BMC to provide a more accurate timestamp has become one of the problems to be addressed by persons skilled in the art.

SUMMARY OF THE INVENTION

The invention is directed to a method for obtaining timestamp and a computer device using the method.

An embodiment of the invention proposes a computer device, including a processor, a counter device and a baseboard management controller. The processor generates at least one signal. The counter circuit includes at least one counter, and the at least one counter is coupled to the at least one signal and receives an internal clock signal of the computer device. The baseboard management controller is coupled to the at least one counter and activates the at least one counter. The at least one counter detects the at least one signal, so as to start counting for generating a count value according to an internal clock signal when the at least one signal is enabled. Next, the baseboard management controller controls the at least one counter to stop counting and obtains an enabled timepoint of the at least one signal according to the count value and a timepoint where the at least one counter is stopped, so as to use the enabled timepoint as a timestamp of the at least one signal.

Another embodiment of the embodiment proposes a method for obtaining timestamp, which is adapted to a computer device. The method includes the followings. At least one counter is activated by a baseboard management controller. The at least one counter detects the at least one signal, so as to start counting for generating a count value according to an internal clock signal of the computer device when the at least one signal is enabled. The at least one counter is controlled by the baseboard management controller to stop counting, and an enabled timepoint of the at least one signal is obtained according to the count value and a timepoint where the at least one counter is stopped, so as to use the enabled timepoint as a timestamp of the at least one signal.

Based on the above, according to the invention, the baseboard management controller can record the timestamp where the event occurs. In this way, when the computer device records the timestamp where the event occurs, an accuracy of the timestamp can be prevented from influences due to insufficient computing capability of the baseboard management controller. By obtaining the enabled timepoint of the corresponding signal according to the count value of the counter and the timepoint where the counter is stopped, regardless of whether the firmware of the baseboard management controller reads the counter value of the counter circuit earlier or later, the accuracy of the obtained enabled timepoint will not be influenced. Accordingly, when multiple events occur at the same time or at very close timepoints, SEL can still record the timestamp which is very accurate for each event, so as facilitate system administrators in determining the order in which the events occur.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
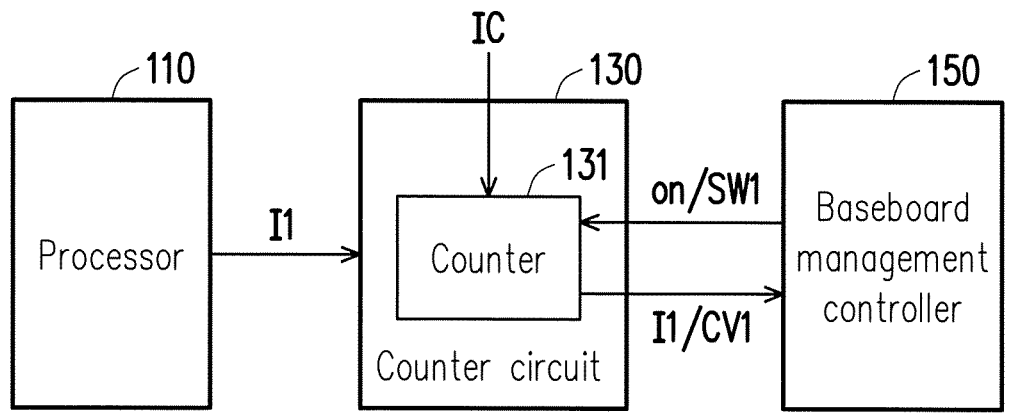
FIG. 1 illustrates a schematic diagram of a computer device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of a computer device 100 according to an embodiment of the invention. The computer device 100 may include a processor 110, a counter circuit 130 and a baseboard management controller 150. The processor 110 may be configured to process digital signals and execute a method for obtaining timestamp as proposed in embodiments of the invention. Functions of the processor 110 may be implemented by using programming units or hardware circuits, such as, a microprocessor, a microcontroller, a Digital Signal Processor (DSP) chip, a Field-programmable Gate Array (FPGA) or a Complex Programmable Logic Device (CPLD).

The counter circuit 130 includes at least one counter 131, and the counter 131 is capable of receiving an internal clock signal IC of the computer device 100. The counter circuit 130 is coupled to or is connected to the processor 110. Further, the counter 131 can start accumulating a count value CV1 upon receiving an activate command ON, and can also stop accumulating the count value CV1 upon receiving a stop command SW1. Functions of the counter circuit 130 may be implemented by the FPGA or the CPLD, and the activate command ON and the stop command SW1 may be software commands, which are not particularly limited by the invention.

The baseboard management controller 150 is coupled to the counter 131 and can serve as a core controller of a management platform of IPMI. A system management software can perform remote managements by communicating with each device in a management platform system through the baseboard management controller 150. The baseboard management controller 150 can also record events occurred in entire management platform system together with the corresponding timepoints into System Event Log (SEL) for system administrators to look up.

In the present embodiment, the processor 110 may be configured to generate at least one signal IL For instance, the signal I1 may be an interrupt signal caused by CPU Machine Check Error (hereinafter, referred to as MC Error) or Memory Uncorrectable Error (hereinafter, referred to as Mem Error) or sent by the processor.

The counter 131 may be coupled to the signal I1. When the baseboard management controller 150 is activated, the baseboard management controller 150 can send, for example, the activate command ON to the counter 131 for activating the counter 131 so the counter 131 starts detecting the signal IL When the counter 131 detects that the signal I1 is enabled, the counter 131 starts counting according to a cycle of the internal clock signal IC, so as to generate the count value CV1.

When the counter 131 starts counting, the signal I1 is transmitted to the baseboard management controller 150 via the counter 131. Traditionally, in response to the signal I1 received by the baseboard management controller, the baseboard management controller records a timestamp when the signal I1 is received into SEL for system administrators to look up. However, as restricted by a computing capability of the baseboard management controller itself, the timestamp of the signal I1 recorded in SEL by the baseboard management controller is often later than the time when the signal I1 is actually received, and thus the accuracy of the timestamp is reduced.

Relatively, in the present embodiment, in response to the signal I1 received by the baseboard management controller 150, the baseboard management controller 150 controls the counter 131 to stop counting and obtains an enabled timepoint of the corresponding signal I1 according to the count value CV1 of the counter 131 and a timepoint where the counter 131 is stopped, so as to use the enabled timepoint as the timestamp of the signal IL Specifically, the baseboard management controller 150 can obtain the enabled timepoint (i.e., the timestamp of the signal I1) by subtracting the cycle of the internal clock signal IC times a value of the count value CV1 from timepoint where the counter 131 is stopped.

Figure 2:
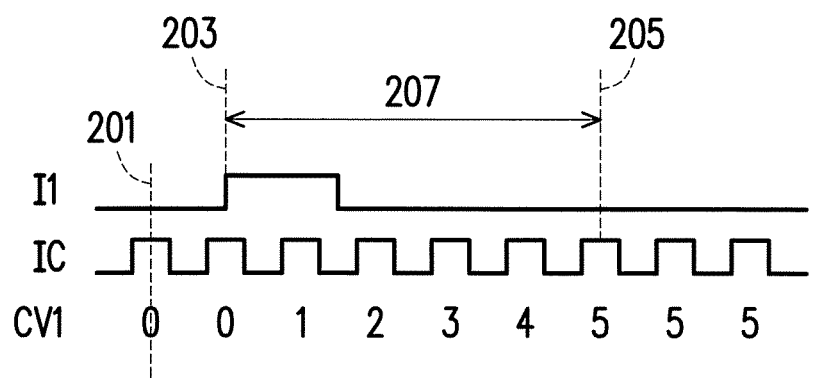
FIG. 2 illustrates a timing diagram of an internal signal of the computer device according to an embodiment of the invention.

More details are provided below with reference to FIG. 2. FIG. 2 illustrates a timing diagram of an internal signal of the computer device 100 according to an embodiment of the invention. It should be noted that, the timing diagram in FIG. 2 serves only to help understanding reference examples of the invention more clearly instead of limitations to the invention. In the present embodiment, when the baseboard management controller 150 is activated, the baseboard management controller 150 can send the activate command ON to the counter 131 at a timepoint 201 such that the counter 131 can start detecting whether the signal I1 corresponding to the counter 131 is enabled. After the counter 131 is activated, if an event occurs on the computer device 100 (e.g., when MC Error occurs on the processor), the signal I1 corresponding to the event (e.g., the interrupt signal corresponding MC Error) is enabled at a timepoint 203. Then, the counter 131 accumulates the count value CV1 according to the internal clock signal IC starting from the timepoint 203 until the counter 131 receives the stop command SW1 from the baseboard management controller 150 at a timepoint 205.

After the signal I1 is transmitted to the baseboard management controller 150 via the counter 131, the baseboard management controller 150 sends the stop command SW1 to the counter 131 so as to notice the counter 131 to stop counting. Next, the counter 131 reads the count value CV1 stored in the counter 131. In the embodiment of FIG. 2, the baseboard management controller 150 sends the stop command SW1 to the counter 131 at the timepoint 205, and reads the count value C1 with a value "5".

It should be noted that, although a rising edge of the signal I1 is used as the enabled timepoint of the signal I1 in the embodiment of FIG. 2, the invention is not limited thereto. For example, a falling edge of the signal I1 may also be used as the enabled timepoint of the signal I1.

After the count value CV1 is obtained by the baseboard management controller 150, the baseboard management controller 150 can subtract the cycle of the internal clock signal IC times the value "5" of the count value CV1 from the timepoint 205 where the counter 131 is stopped. Herein, the product of the cycle of the internal clock signal IC multiplied by the count value CV1 will be a value very close to a time interval 207 in FIG. 2. In other words, the baseboard management controller 150 can subtract the value close to the time interval 207 from the timepoint 205, so as to obtain the enabled timepoint of the signal I1 that is very close to the timepoint 203. Thereafter, the baseboard management controller 150 can use the enabled timepoint of the signal I1 as the timestamp of the signal I1.

Figure 3:
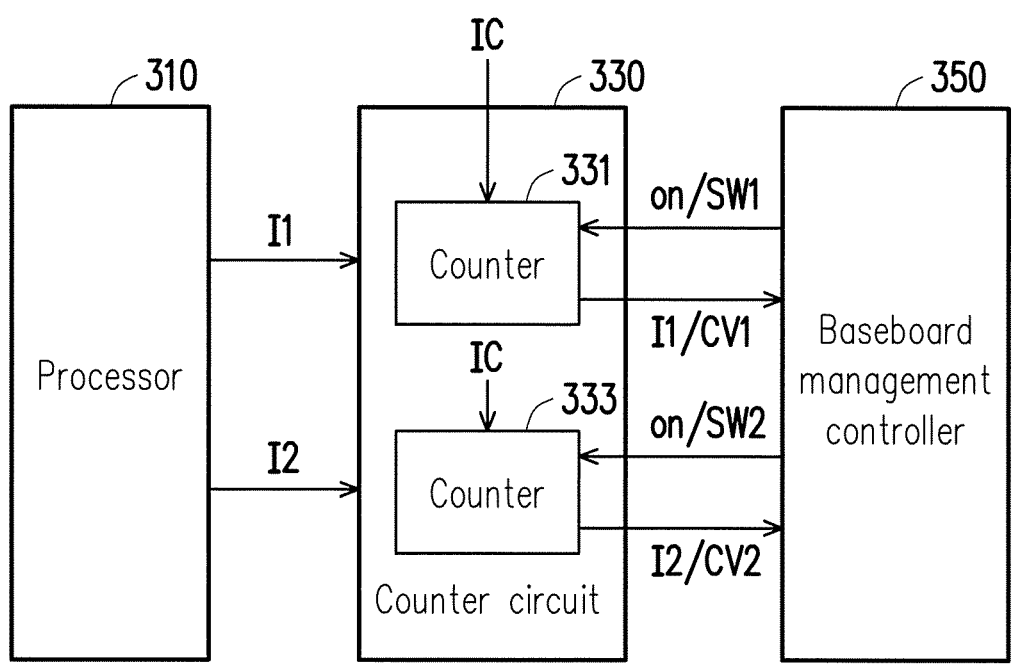
FIG. 3 illustrates a schematic diagram of another computer device according to an embodiment of the invention.

FIG. 3 illustrates a schematic diagram of another computer device 300 according to an embodiment of the invention. The computer device 300 may include a processor 310, a counter circuit 330 and a baseboard management controller 350, and the baseboard management controller 350 may include a counter 331 and a counter 333. Among them, functions and structures of the processor 310, the counter circuit 330, the counter 331 (and the counter 333) and the baseboard management controller 350 may refer to functions and structures of the processor 110, the counter circuit 130, the counter 131 and the baseboard management controller 150 of the computer device 100 respectively, which are not repeated hereinafter.

The major difference between the computer device 100 and the computer device 300 is that, the counter circuit 330 includes two counters—the counter 331 and the counter 333. In addition, the processor 310 can send two signals I1 and I2, and the signals I1 and I2 correspond to the counter 331 and the counter 333. For instance, the signal I1 may be an MC Error interrupt signal being sent due to CPU Machine Check Error, and the signal I2 may be an Mem Error interrupt signal being sent due to Memory Uncorrectable Error, but the invention is not limited to the above.

A method for obtaining the timestamps of the signal I1 and the signal I2 used by the baseboard management controller 350 is identical to the method for obtaining timestamp of the the signal I1 in the embodiment of FIG. 1. When the signal I1 and the signal I2 are enabled at the same time or at very close timepoints, the baseboard management controller 350 can obtain the timestamp of the signal I1 and the timestamp of the signal I2 (which are more accurate) by the method described in the embodiment of FIG. 1. For example, the timestamps of the signal I1 and the signal I2 may be accurate at millisecond level. After the baseboard management controller 350 obtains the timestamp of the signal I1 and the timestamp of the signal I2, the baseboard management controller 350 can find out or obtain an exact timepoint where an interrupt event occurs for each of the corresponding signal I1 and the corresponding signal I2 according to the timestamps of the signal I1 and the signal I2. For example, when the signal I1 include the timepoint where interrupt event occurs being earlier than that of the signal I2, because the baseboard management controller 350 does record the timestamps of the signal I1 and the signal I2 into SEL, later, system administrators can determine that the time when CPU Machine Check Error occurs as corresponding to corresponding signal I1 is earlier than the time when Mem Error occurs as corresponding to the corresponding signal I2. As a result, system administrators can conduct system debugging more smoothly.

It should be noted that, the embodiment of FIG. 3 uses the example in which the processor 310 can send two signals and the counter circuit 330 can include two counters 331 and 333. However, persons skilled in the art should understand that, the number of signals that can be sent by the processor and the number of counters that can be included by the counter circuit may be changed by users based on requirements, which are not particularly limited by the invention.

Figure 4:
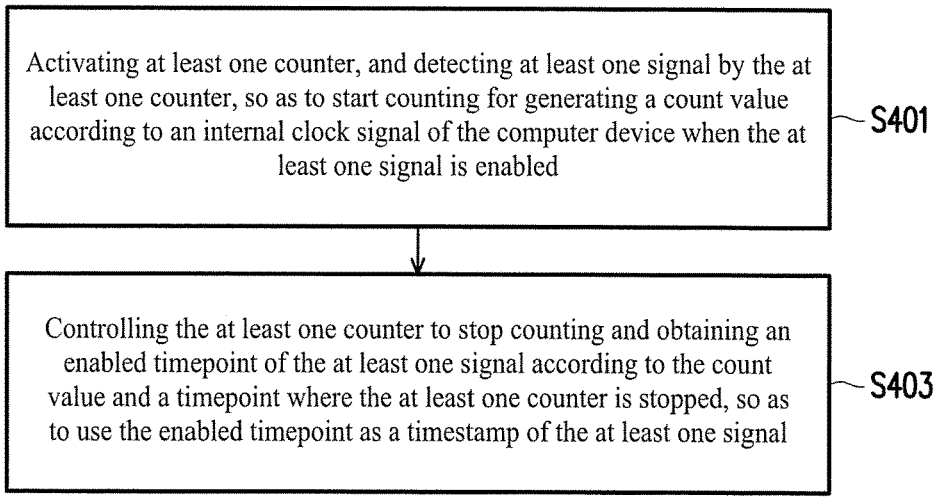
FIG. 4 illustrates a method for obtaining timestamp according to an embodiment of the invention.

FIG. 4 illustrates a method for obtaining timestamp according to an embodiment of the invention. The method of FIG. 4 is adapted to the computer device 100 disclosed by the invention. In step S401, at least one counter 131 is activated, and at least one signal I1 corresponding thereto is detected by the at least one counter 131, so as to start counting for generating a count value CV1 according to an internal clock signal IC of the computer device 100 when the at least one signal I1 is enabled. In step S403, the at least one counter 131 is controlled to stop counting and an enabled timepoint of the at least one signal I1 is obtained by the at least one counter 131 according to the count value CV1 and a timepoint where the at least one counter is stopped, so as to use the enabled timepoint as a timestamp of the at least one signal I1.

Figure 5:
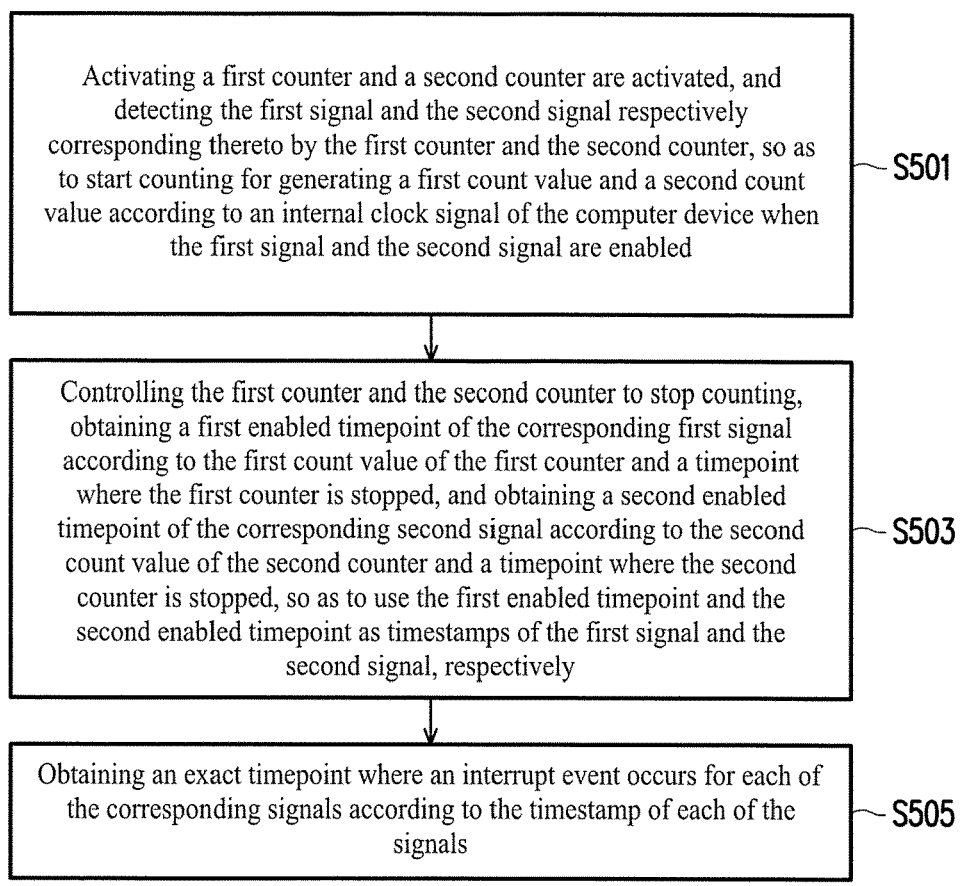
FIG. 5 illustrates another method for obtaining timestamp according to an embodiment of the invention.

FIG. 5 illustrates another method for obtaining timestamp according to an embodiment of the invention. The method of FIG. 5 is adapted to the computer device 300 disclosed by the invention. In step S501, a first counter 331 and a second counter 333 are activated, and the first signal I1 and the second signal I2 respectively corresponding thereto are detected by the first counter 331 and the second counter 333, so as to start counting for generating a first count value CV1 and a second count value CV2 according to an internal clock signal IC of the computer device 300 when the first signal I1 and the second signal I2 are enabled. In step S503, the first counter 331 and the second counter 333 are controlled to stop counting, a first enabled timepoint of the corresponding first signal I1 is obtained according to the first count value CV1 of the first counter 331 and a timepoint where the first counter 331 is stopped, and a second enabled timepoint of the corresponding second signal I2 is obtained according to the second count value CV2 of the second counter 333 and a timepoint where the second counter 333 is stopped, so as to use the first enabled timepoint and the second enabled timepoint as timestamps of the first signal I1 and the second signal I2, respectively. In step S505, an exact timepoint where an interrupt event occurs is found out for each of the corresponding signals according to the timestamp of each of the signals.

In summary, according to the invention, the baseboard management controller can record the timestamp where the event occurs. In this way, when the computer device records the timestamp where the event occurs, an accuracy of the timestamp can be prevented from influences due to insufficient computing capability of the baseboard management controller. By obtaining the enabled timepoint of the corresponding signal according to the count value of the counter and the timepoint where the counter is stopped, regardless of whether the firmware of the baseboard management controller reads the counter value of the counter circuit earlier or later, the accuracy of the obtained enabled timepoint will not be influenced. Accordingly, when multiple events occur at the same time or at very close timepoints, SEL can still record the timestamp which is very accurate for each event, so as facilitate system administrators in determining the order in which the events occur.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer device, comprising:
   a processor, generating at least one signal;
   a counter circuit, comprising at least one counter, wherein the at least one counter is coupled to the at least one signal, and the at least one counter receives an internal clock signal of the computer device; and
   a baseboard management controller, coupled to the at least one counter,
   wherein the baseboard management controller activates the at least one counter, and controls the at least one counter to detect the at least one signal and start counting for generating a count value according to the internal clock signal when the at least one signal is enabled, wherein the baseboard management controller controls the at least one counter to stop counting, and obtains an enabled timepoint of the at least one signal according to the count value of the at least one counter and a timepoint where the at least one counter is stopped, so as to use the enabled timepoint as a timestamp of the at least one signal.

2. The computer device according to claim 1, wherein the baseboard management controller obtains the enabled timepoint by subtracting a cycle of the internal clock signal times a value of the count value from the timepoint where the at least one counter is stopped.

3. The computer device according to claim 1, wherein the at least one signal is an interrupt signal sent by the processor.

4. The computer device according to claim 1, wherein the counter circuit is implemented by a complex programmable logic device or a field-programmable gate array.

5. The computer device according to claim 1, wherein the baseboard management controller obtains an exact timepoint where an interrupt event occurs for each of the at least one signal according to the timestamp of each of the at least one signal.

6. A method for obtaining timestamp adapted to a computer device, comprising:

activating at least one counter, and controlling the at least one counter to detect at least one signal and start counting for generating a count value according to an internal clock signal of the computer device when the at least one signal is enabled; and controlling the at least one counter to stop counting, and obtaining an enabled timepoint of the at least one signal according to the count value of the at least one counter and a timepoint where the at least one counter is stopped, so as to use the enabled timepoint as a timestamp of the at least one signal.

7. The method for obtaining timestamp according to claim 6, further comprising:

obtaining the enabled timepoint by subtracting a value of a cycle of the internal clock signal times a value of the count value from the timepoint where the at least one counter is stopped.

8. The method for obtaining timestamp according to claim 6, wherein the at least one signal is an interrupt signal sent by a processor in the computer device.

9. The method for obtaining timestamp according to claim 6, wherein the counter is implemented by a complex programmable logic device or a field-programmable gate array.

10. The method for obtaining timestamp according to claim 6, further comprising:

obtaining an exact timepoint where an interrupt event occurs for each of the at least one signal according to the timestamp of each of at least one signal.

* * * * *